(12) United States Patent
Hirota

(10) Patent No.: US 11,598,366 B2
(45) Date of Patent: Mar. 7, 2023

(54) DUST COVER AND SEALING STRUCTURE

(71) Applicant: NOK CORPORATION, Tokyo (JP)

(72) Inventor: Takuma Hirota, Makinohara (JP)

(73) Assignee: NOK CORPORATION, Tokyo (JP)

(*) Notice: Subject to any disclaimer, the term of this patent is extended or adjusted under 35 U.S.C. 154(b) by 1331 days.

(21) Appl. No.: 15/776,288

(22) PCT Filed: Nov. 1, 2016

(86) PCT No.: PCT/JP2016/082387
§ 371 (c)(1),
(2) Date: May 15, 2018

(87) PCT Pub. No.: WO2017/086142
PCT Pub. Date: May 26, 2017

(65) Prior Publication Data
US 2018/0347621 A1 Dec. 6, 2018

(30) Foreign Application Priority Data
Nov. 16, 2015 (JP) .............................. JP2015-224070

(51) Int. Cl.
*F16C 11/06* (2006.01)
*F16J 3/04* (2006.01)
(Continued)

(52) U.S. Cl.
CPC ................. *F16C 11/06* (2013.01); *F16J 3/04* (2013.01); *F16J 3/042* (2013.01); *F16J 15/3204* (2013.01); *F16J 15/52* (2013.01)

(58) Field of Classification Search
CPC ........ F16J 3/00; F16J 3/04; F16J 3/041; F16J 3/042; F16J 15/00; F16J 15/16;
(Continued)

(56) References Cited

U.S. PATENT DOCUMENTS

| 5,601,378 A | 2/1997 | Fukukawa et al. |
| 2009/0047063 A1* | 2/2009 | Shirai ................. F16C 11/0671 403/135 |

(Continued)

FOREIGN PATENT DOCUMENTS

| EP | 1865212 A1 | 12/2007 |
| EP | 2562434 A1 | 2/2013 |

(Continued)

OTHER PUBLICATIONS

Extended European Search Report dated Jun. 5, 2019 (corresponding to EP 16866144.5).

(Continued)

*Primary Examiner* — Nathan Cumar
(74) *Attorney, Agent, or Firm* — Harness, Dickey & Pierce, P.L.C.

(57) ABSTRACT

A dust cover and a sealing structure for improving sealing performance by stabilizing a posture of a seal section. A seal section 130 includes: an inner peripheral seal part 131 which is slidable with respect to an outer peripheral surface of a shaft part 310; a dust lip part 132 which is slidable with respect to an end surface of a first flange part 340; and an auxiliary dust lip part 133 provided on an radially inner side of the dust lip part 132, and the auxiliary dust lip part 133 is configured to be slidable with respect to a curved surface 310a which connects the shaft part 310 and the first flange part 340 to each other.

14 Claims, 5 Drawing Sheets

(51) Int. Cl.
*F16J 15/3204* (2016.01)
*F16J 15/52* (2006.01)
(58) Field of Classification Search
CPC .... F16J 15/50; F16J 15/52; F16J 15/32; F16J 15/3204; F16J 15/3216; F16J 15/525; F16J 15/54; F16C 11/00; F16C 11/06
USPC .......................................................... 403/76
See application file for complete search history.

(56) References Cited

U.S. PATENT DOCUMENTS

| | | | |
|---|---|---|---|
| 2013/0028655 A1* | 1/2013 | Ikeda | F16C 11/0695 403/50 |
| 2013/0033016 A1* | 2/2013 | Kuroda | F16J 3/042 280/124.106 |
| 2013/0287478 A1* | 10/2013 | Shibata | B62D 7/166 403/134 |

FOREIGN PATENT DOCUMENTS

| | | |
|---|---|---|
| JP | H09-166130 A | 6/1997 |
| JP | 2004-263738 A | 9/2004 |
| JP | 2011-226595 A | 11/2011 |
| JP | 2013-024385 A | 2/2013 |
| WO | 2006098124 A1 | 9/2006 |

OTHER PUBLICATIONS

Japanese Office Action dated Sep. 10, 2019 (English translation), corresponding to JP2017-551806.

* cited by examiner

DUST COVER AND SEALING STRUCTURE

CROSS-REFERENCE TO RELATED APPLICATIONS

This application is a National Stage of International Application No. PCT/JP2016/082387, filed Nov. 1, 2016 (now WO 2017/086142A1), which claims priority to Japanese Application No. 2015-224070, filed Nov. 16, 2015. The entire disclosures of each of the above applications are incorporated herein by reference.

FIELD

The present disclosure relates to a dust cover and a sealing structure used in a ball joint provided in various apparatuses such as a vehicle.

BACKGROUND

Conventionally, in a ball joint provided in various apparatuses such as a vehicle, a dust cover is used in order to prevent water, dust, and the like from entering a joint section and to prevent grease from flowing out of the joint section. A dust cover according to a conventional example will now be described with reference to FIGS. 4 and 5. FIG. 4 is a partially enlarged sectional view of a dust cover (an enlarged sectional view of a seal section) according to a conventional example. FIG. 5 is a partially enlarged view of a ball joint in which the dust cover according to the conventional example is used.

The ball joint includes: a ball stud 300 which has a spherical part at one end of a shaft part 310 and which has a flange part 340 at the other end of the shaft part 310; and a socket which has a bearing of the spherical part and which rotatably and swingably supports the ball stud 300. In addition, the dust cover includes: a deformable film-like body section; a fixed part which is provided on at one end of the body section and which is fixed to the socket; and a seal section 530 which is provided at the other end of the body section. Furthermore, the seal section 530 includes: an inner peripheral seal part 531 which is slidably provided on the shaft part 310 in the ball stud 300; a dust lip part 532 which is slidably provided with respect to the flange part 340; and an auxiliary dust lip part 533 which is provided on an radially inner side of the dust lip part 532. In addition, in this conventional example, the inner peripheral seal part 531 is constituted by two annular protrusion parts 531a and 531b.

There may be cases where the shaft part 310 and the flange part 340 are connected to each other by a curved surface 310a in the ball stud 300 due to various reasons such as manufacturing methods. For example, when integrally providing the shaft part 310 and the flange part 340, the curved surface 310a is formed to allow cutting to be performed more conveniently. During assembly, for example, of a ball joint with such a structure, the annular protrusion part 531a constituting the inner peripheral seal part 531 may inadvertently make a close contact with the curved surface 310a. In this case, the seal section 530 tilts and, as shown in FIG. 5, the dust lip part 532 and the auxiliary dust lip part 533 may become separated from the flange part 340. As a result, sealing performance declines. Above described problems are likely to occur in a case where the seal section 530 is composed only of an elastic body such as rubber and a reinforcement ring is not provided inside the seal section 530. The strength of the ball stud 300 becomes stronger as a radius of curvature of the curved surface 310a (a so-called R-surface) becomes larger. In view of this, the radius of curvature of the curved surface 310a would be made larger in order to increase the strength while above described problems are more likely to occur.

CITATION LIST

Patent Literature

[PTL 1] Japanese Patent Application Laid-open No. 2011-226595

SUMMARY

Technical Problem

An object of the present disclosure is to provide a dust cover and a sealing structure in which a posture of a seal section is stabilized and thereby sealing performance is improved.

Solution to Problem

In order to achieve the object described above, the present disclosure adopts the following means.

Specifically, a dust cover according to the present disclosure is a dust cover used in a ball joint, the ball joint including: a ball stud which has at one end of a shaft part thereof a spherical part and which has at the other end of the shaft part thereof a flange part; and a socket which has a bearing for the spherical part and which rotatably and swingably supports the ball stud, the dust cover including: a deformable body section; a fixed part which is provided at one end of the body section and which is configured to be fixed to the socket; and a seal section which is provided at the other end of the body section and which is configured to be slidable with respect to both the shaft part and the flange part, wherein the seal section includes: an inner peripheral seal part which is configured to be slidable with respect to an outer peripheral surface of the shaft part (in the present disclosure, the shaft part may not be limited to a shaft part itself in the ball stud and may be a different member provided on the outer peripheral side of the shaft part: the same applies hereinafter); a dust lip part which is configured to be slidable with respect to an end surface of the flange part; and an auxiliary dust lip part which is provided on a radially inward side of the dust lip part, wherein the auxiliary dust lip part is configured to be slidable with respect to a curved surface connecting the shaft part to the flange part.

A sealing structure according to the present disclosure is a sealing structure including: a ball stud having a shaft part, a spherical part which is provided at one end of the shaft part, and a flange part which is provided at the other end of the shaft part; a socket having a bearing for the spherical part and rotatably and swingably supporting the ball stud; and a dust cover having a deformable body section, a fixed part which is provided at one end of the body section and which is fixed to the socket, and a seal section which is provided at the other end of the body section, the seal section being slidable with respect to both the shaft part and the flange part, wherein the seal section includes: an inner peripheral seal part which is slidable with respect to an outer peripheral surface of the shaft part; a dust lip part which is slidable with respect to an end surface of the flange part; and an auxiliary dust lip part which is provided on a radially inward side of the dust lip part, wherein the auxiliary dust lip part is slidable with respect to a curved surface connecting the shaft part to the flange part.

According to these disclosures, since the auxiliary dust lip part is configured to be slidable with respect to the curved surface connecting the shaft part and the flange part to each other, the inner peripheral seal part is prevented from making close contact with the curved surface and a posture of the seal section can be stabilized.

Favorably, the auxiliary dust lip part may include an inclined surface with a diameter that increases toward a tip thereof, and the inclined surface may slidably make close contact with the curved surface.

Accordingly, the contact state of the auxiliary dust lip with the curved surface can be stabilized and the posture of the seal section can be more reliably stabilized.

Favorably, the inner peripheral seal part may be constituted by an annular protrusion part.

Advantageous Effects of the Disclosure

As described above, according to the present invention, the posture of the seal section can be stabilized and thereby sealing performance can be improved.

DRAWINGS

DETAILED DESCRIPTION

A mode for implementing the present disclosure will now be exemplarily described in detail based on an embodiment with reference to the drawings. It is to be understood that dimensions, materials, shapes, relative arrangements, and the like of components described in the embodiment are not intended to limit the scope of the present disclosure to the embodiment described below unless otherwise noted.

Embodiment

Figure 1:
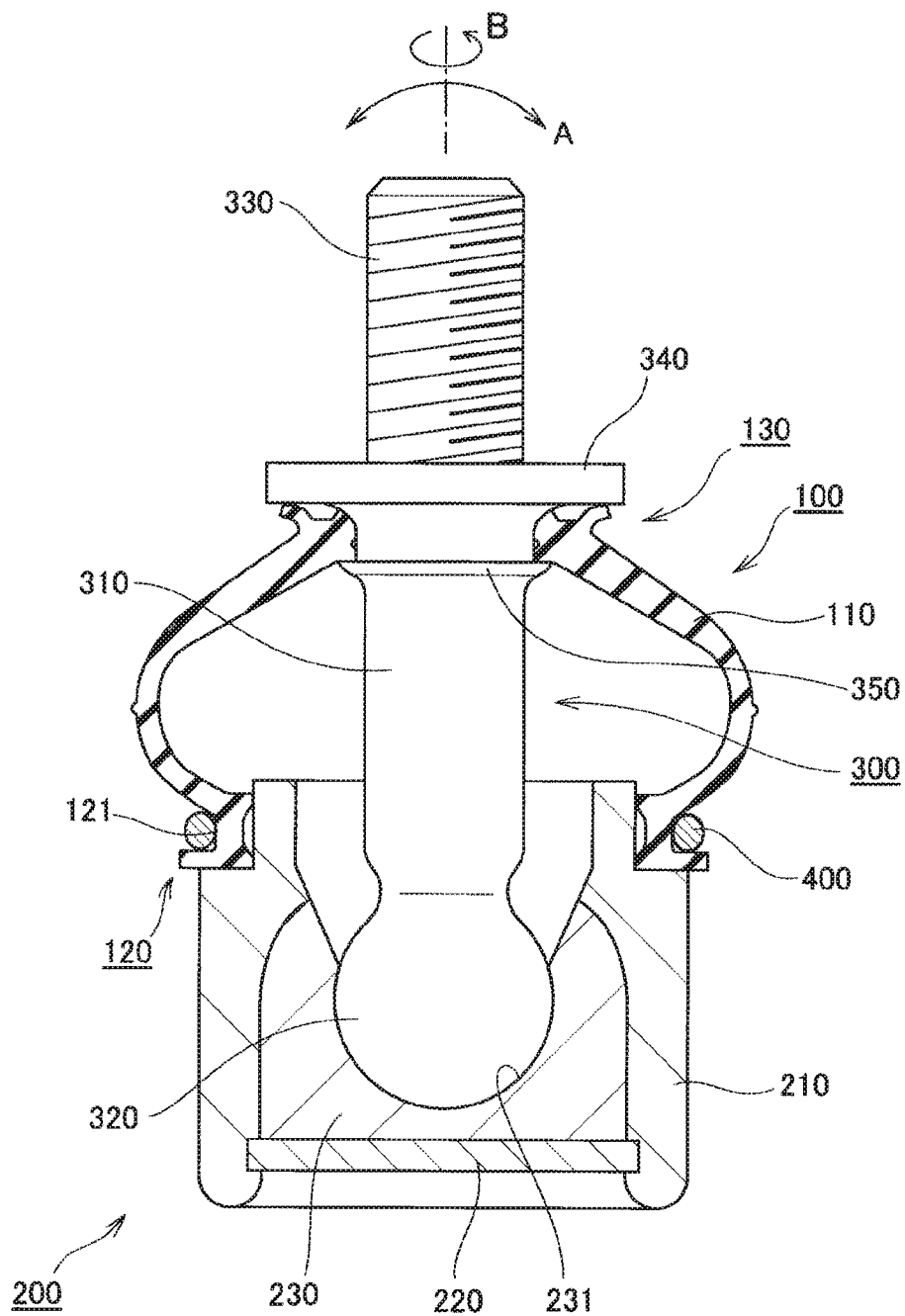
FIG. 1 is a schematic sectional view of a ball joint and a dust cover mounted to the ball joint according to an embodiment of the present disclosure.
Figure 2:
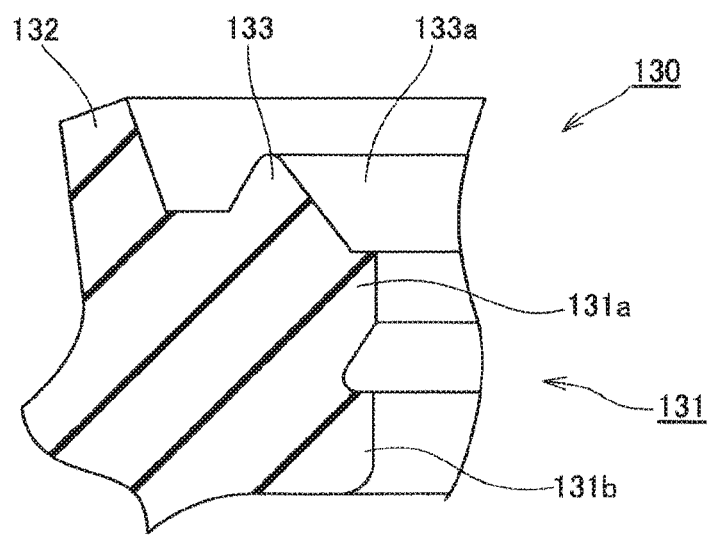
FIG. 2 is a partially enlarged sectional view of the dust cover (an enlarged sectional view of a seal section) according to the embodiment of the present disclosure.
Figure 3:
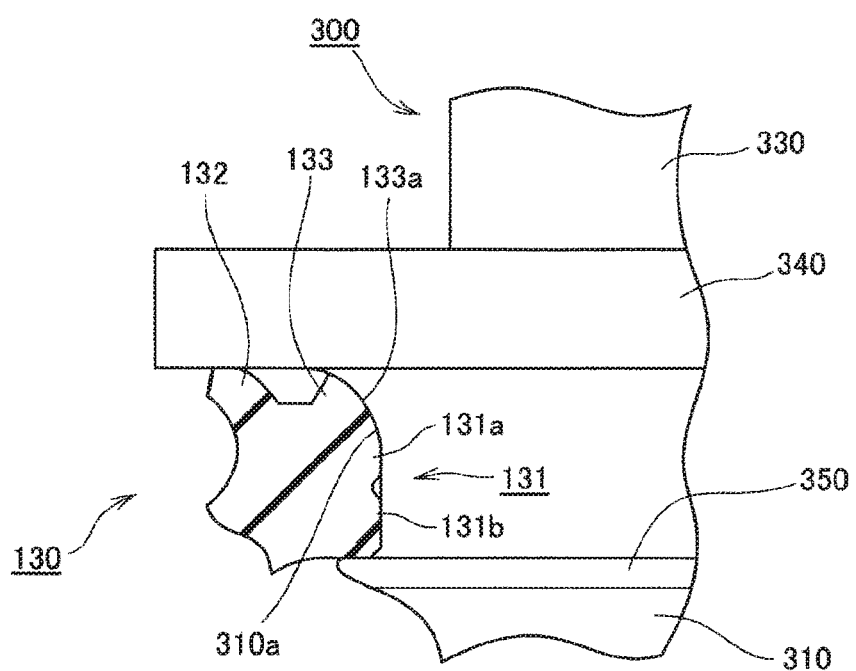
FIG. 3 is a partially enlarged view of a ball joint in which the dust cover according to the embodiment of the present disclosure is used.
Figure 4:
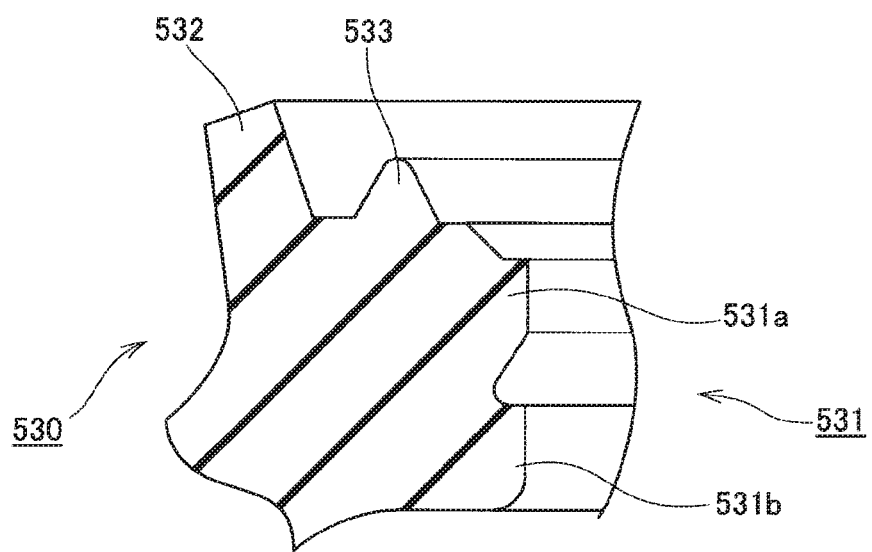
FIG. 4 is a partially enlarged sectional view of a dust cover (an enlarged sectional view of a seal section) according to the conventional example.
Figure 5:
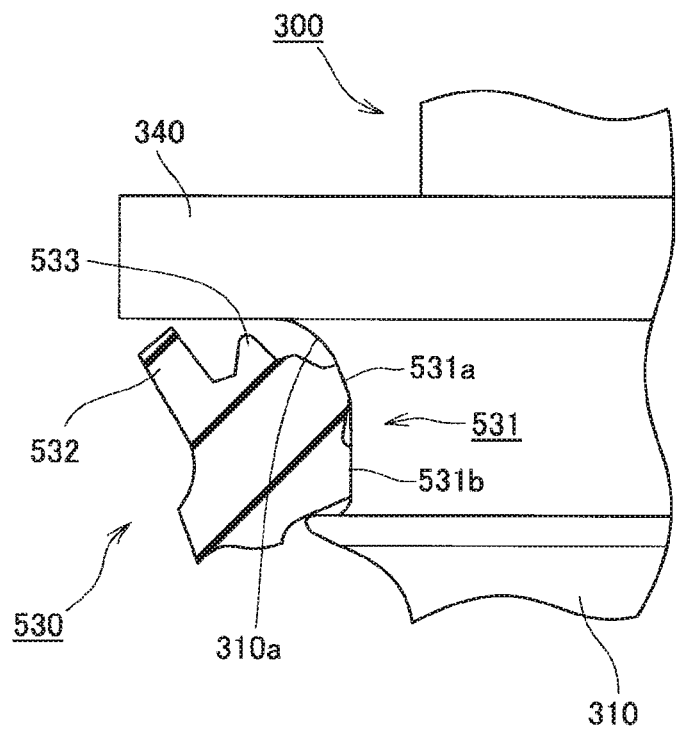
FIG. 5 is a partially enlarged view of a ball joint in which the dust cover according to the conventional example is used.

A dust cover and a sealing structure according to an embodiment of the present disclosure will now be described with reference to FIGS. 1 to 3. FIG. 1 is a schematic sectional view of a ball joint and a dust cover mounted to the ball joint according to an embodiment of the present disclosure. Note that FIG. 1 shows a sectional view cut by a plane which includes a central axis of a shaft part of a ball stud provided in the ball joint. FIG. 2 is a partially enlarged sectional view of the dust cover (an enlarged sectional view of a seal section) according to the embodiment of the present disclosure. FIG. 3 is a partially enlarged view of a ball joint in which the dust cover according to the embodiment of the present disclosure is used. Note that FIG. 3 shows an enlarged sectional view of a vicinity of a seal section in the dust cover.

<Ball Joint>

An example of a ball joint to which a dust cover 100 according to the present embodiment is applicable will be described particularly with reference to FIG. 1. The ball joint includes: a ball stud 300 which has a spherical part 320 at one end of a shaft part 310; and a socket 200 which rotatably and swingably supports the ball stud 300. In addition, a male screw part 330 is formed at the other end of the shaft part 310. The shaft part 310 is provided with two flange parts 340 and 350. For the sake of convenience, of the two flange parts, a flange part on a side of the other end will be referred to as a first flange part 340 and a flange part on the side of the one end will be referred to as a second flange part 350. In this case, end surfaces of the shaft part 310 and the first flange part 340 on the one end side are connected to each other by a curved surface (a so-called R-surface) 310a. The ball stud 300 configured as described above is fixed to a knuckle (not shown) or the like provided on a vehicle body by screwing a nut (not shown) onto the male screw part 330.

The socket 200 includes an annular case 210, a bottom plate 220 which is fixed to a bottom side of the case 210, and a bearing 230 for the spherical part 320. The bearing 230 has a bearing surface 231 constituted by a spherical surface with a same radius as a radius of curvature of the spherical part 320.

The dust cover 100 is used in order to prevent water, dust, and the like from entering a joint section and to prevent grease from flowing out of the joint section.

<Dust Cover>

An overall configuration of the dust cover 100 will now be described. The dust cover 100 is constituted by an elastic body such as rubber. The dust cover 100 integrally includes: an annular and film-like deformable body section 110; a fixed part 120 which is provided at one end of the body section 110 and which is fixed to the socket 200; and a seal section 130 which is provided at the other end of the body section 110.

In the dust cover 100 configured as described above, when the ball stud 300 swings (in a direction of an arrow A) with respect to the socket 200, the body section 110 deforms. When the ball stud 300 rotates (in a direction of an arrow B) with respect to the socket 200, the seal section 130 rotates with respect to each of the shaft part 310 and the first flange part 340 of the ball stud 300. Accordingly, a sealing function is performed by the dust cover 100 regardless of whether the ball stud 300 swings or rotates with respect to the socket 200.

«Fixed Part»

An annular groove 121 is provided on an outer peripheral surface of the fixed part 120. When a retaining ring (a circlip) 400 is mounted to the annular groove 121, an inner peripheral surface of the fixed part 120 makes close contact with the case 210 of the socket 200. Accordingly, water, dust, and the like are prevented from entering the joint section from between the fixed part 120 and the socket 200 and, at the same time, grease is prevented from flowing out from the joint section.

«Seal Section»

The seal section 130 according to the present embodiment will now be described in greater detail. The seal section 130 includes: an inner peripheral seal part 131 which is slidable with respect to an outer peripheral surface of the shaft part 310 of the ball stud 300; and a dust lip part 132 which is slidable with respect to an end surface of the first flange part 340. The inner peripheral seal part 131 according to the present embodiment is constituted by two annular protrusion parts 131a and 131b which protrude radially inward. However, the inner peripheral seal part according to the present disclosure is not limited to this configuration. For example, an inner peripheral seal part constituted by one annular protrusion part or three or more annular protrusion parts can be adopted. The dust lip part 132 is constituted by an inclined portion which inclines radially outward as well as toward an end surface of the first flange part 340.

In the dust cover 100 according to the present embodiment, an auxiliary dust lip part 133 configured to protrude toward the other end is provided on a radially inner side of the dust lip part 132. The auxiliary dust lip part 133 is configured to be slidable with respect to the curved surface 310a which connects the shaft part 310 and the first flange part 340 in the ball stud 300 to each other. The auxiliary dust lip part 133 includes an inclined surface 133a with a diameter that increases toward a tip thereof, and the inclined surface 133a is configured to slidably make close contact with the curved surface 310a (refer to FIG. 3). The auxiliary dust lip part 133 configured as described above performs, like the dust lip part 132, a function of suppressing entering of dust. The auxiliary dust lip part 133 further performs a function of stabilizing a posture of the seal section 130. It should be noted that the seal section 130 according to the present embodiment is neither provided with a reinforcement ring or the like in it nor provided with a member that is tightened around the seal section 130 from an outer peripheral surface thereof.

The seal section 130 configured as described above is placed between the first flange part 340 and the second flange part 350 provided in the shaft part 310 of the ball stud 300. The inner peripheral seal part 131 constituted by the two annular protrusion parts 131a and 131b slidably makes close contact with the outer peripheral surface of the shaft part 310. As described above, the dust lip part 132 slidably makes close contact with an end surface of the first flange part 340 and the auxiliary dust lip part 133 slidably makes close contact with the curved surface 310a which connects the shaft part 310 and the first flange part 340 to each other. Since the second flange part 350 performs a stopper function, the seal section 130 is positioned in an axial direction with respect to the shaft part 310. Specifically, an inner peripheral-side portion of the seal section 130 becomes sandwiched between the curved surface 310a and the second flange part 350 to cause the seal section 130 to be positioned in the axial direction. The auxiliary dust lip part 133 is compressed in the axial direction and thereby a posture of the entire seal section 130 can be stabilized.

<Advantages of Dust Cover and Sealing Structure According to Present Embodiment>

As described above, with the dust cover 100 and the sealing structure according to the present embodiment, the auxiliary dust lip part 133 of the seal section 130 is configured to be slidable with respect to the curved surface 310a which connects the shaft part 310 and the first flange part 340 in the ball stud 300 to each other. Therefore, the inner peripheral seal part 131 is prevented from adhering to the curved surface 310a and a posture of the seal section 130 can be stabilized. In particular, in the present embodiment, the auxiliary dust lip part 133 includes the inclined surface 133a with a diameter that increases toward a tip thereof, and the inclined surface 133a is configured to slidably make close contact with the curved surface 310a. Accordingly, the contact state of the auxiliary dust lip part 133 with the curved surface 310a can be stabilized and the posture of the seal section 130 can be more reliably stabilized. As described above, with the dust cover 100 and the sealing structure according to the present embodiment, improved sealing performance can be achieved.

(Other)

In the above described embodiment, the inner peripheral seal part 131 directly slides with respect to an outer peripheral surface of the shaft part 310 of the ball stud 300. However, the present disclosure is also applicable to another embodiment where the inner peripheral seal part is configured to be slidable with respect to an outer peripheral surface of another member fixed to the shaft part of the ball stud. For example, the present disclosure can also be applied to an embodiment where the inner peripheral seal part is configured to slide with respect to a ferrule as disclosed in Japanese Patent Application Laid-open No. H11-63245.

REFERENCE SIGNS LIST

100 Dust cover
110 Body section
120 Fixed part
121 Annular groove
130 Seal section
131 Inner peripheral seal part
131a, 131b Annular protrusion parts
132 Dust lip part
133 Auxiliary dust lip part
133a Inclined surface
200 Socket
210 Case
220 Bottom plate
230 Bearing
231 Bearing surface
300 Ball stud
310 Shaft part
310a Curved surface
320 Spherical part
330 Male screw part
340 Flange part (first flange part)
350 Flange part (second flange part)

The invention claimed is:

1. A dust cover used in a ball joint, the ball joint including: a ball stud which has, at one end of a shaft part thereof, a spherical part and which has, at the other end of the shaft part thereof, a flange part; and a socket which has a bearing for the spherical part and which rotatably and swingably supports the ball stud,
  the dust cover including: a deformable body section; a fixed part which is provided at one end of the body section and which is configured to be fixed to the socket; and a seal section which is provided at the other end of the body section and which is configured to be slidable with respect to both the shaft part and the flange part, wherein
  the seal section includes:
  an inner peripheral seal part which is configured to be slidable with respect to an outer peripheral surface of the shaft part;
  a dust lip part which is configured to be slidable with respect to an end surface of the flange part; and
  a singular auxiliary dust lip part which protrudes toward the other end and is provided on a radially inward side of the dust lip part, wherein
  the singular auxiliary dust lip part is configured to be slidable with respect to a curved surface connecting the shaft part to the flange part.

2. The dust cover according to claim 1, wherein the singular auxiliary dust lip part includes an inclined surface with a diameter that increases toward a tip thereof, and the inclined surface slidably makes close contact with the curved surface.

3. The dust cover according to claim 2, wherein the inner peripheral seal part is constituted by an annular protrusion part.

4. The dust cover according to claim 2, wherein the inner peripheral seal part is constituted by an annular protrusion part.

5. The dust cover according to claim 2, wherein the singular auxiliary dust lip part further includes a radially outer surface that faces radially outward and the inclined surface is a radially inner surface that faces radially inward.

6. The dust cover according to claim 1, wherein the inner peripheral seal part is constituted by an annular protrusion part.

7. The dust cover according to claim 1, wherein the singular auxiliary dust lip part is configured to be compressed in the axial direction.

8. The dust cover according to claim 1, wherein the singular auxiliary dust lip part includes a radially outer surface that faces radially outward and a radially inner inclined surface that faces radially inward and with a diameter that increases toward a tip thereof, and the inclined surface slidably makes close contact with the curved surface.

9. A sealing structure, comprising:
a ball stud having a shaft part, a spherical part which is provided at one end of the shaft part, and a flange part which is provided at the other end of the shaft part;
a socket having a bearing for the spherical part and rotatably and swingably supporting the ball stud; and
a dust cover having a deformable body section, a fixed part which is provided at one end of the body section and which is fixed to the socket, and a seal section which is provided at the other end of the body section, the seal section being slidable with respect to both the shaft part and the flange part, wherein
the seal section includes:
an inner peripheral seal part which is slidable with respect to an outer peripheral surface of the shaft part;
a dust lip part which is slidable with respect to an end surface of the flange part; and
a singular auxiliary dust lip part which protrudes toward the other end and is provided on a radially inward side of the dust lip part, wherein
the singular auxiliary dust lip part is slidable with respect to a curved surface connecting the shaft part to the flange part.

10. The sealing structure according to claim 9, wherein the singular auxiliary dust lip part includes an inclined surface with a diameter that increases toward a tip thereof, and the inclined surface slidably makes close contact with the curved surface.

11. The sealing structure according to claim 10, wherein the singular auxiliary dust lip part further includes a radially outer surface that faces radially outward, and the inclined surface is a radially inner surface that faces radially inward.

12. The sealing structure according to claim 9, wherein the inner peripheral seal part is constituted by an annular protrusion part.

13. The sealing structure according to claim 12, wherein the inner peripheral seal part is constituted by an annular protrusion part.

14. The sealing structure according to claim 9, wherein the singular auxiliary dust lip part is configured to be compressed in the axial direction.

* * * * *